United States Patent
Lynn

(10) Patent No.: US 8,627,142 B2
(45) Date of Patent: Jan. 7, 2014

(54) FAST RESOURCE RECOVERY AFTER THREAD CRASH

(71) Applicant: Juniper Networks, Inc., Sunnyvale, CA (US)

(72) Inventor: Michael Lynn, Champaign, IL (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 13/739,285

(22) Filed: Jan. 11, 2013

(65) Prior Publication Data

US 2013/0132773 A1 May 23, 2013

Related U.S. Application Data

(63) Continuation of application No. 12/687,275, filed on Jan. 14, 2010, now Pat. No. 8,365,014.

(51) Int. Cl.
*G06F 11/00* (2006.01)

(52) U.S. Cl.
USPC .......................................................... 714/15

(58) Field of Classification Search
USPC .......................................................... 714/15
See application file for complete search history.

(56) References Cited

U.S. PATENT DOCUMENTS

| | | | | |
|---|---|---|---|---|
| 5,442,758 A * | 8/1995 | Slingwine et al. | ............ | 717/147 |
| 5,727,209 A * | 3/1998 | Slingwine et al. | ............ | 718/102 |
| 6,219,690 B1 * | 4/2001 | Slingwine et al. | ............ | 718/102 |
| 6,662,204 B2 * | 12/2003 | Watakabe et al. | ............ | 718/107 |
| 6,748,556 B1 * | 6/2004 | Storino et al. | ................... | 714/42 |
| 6,751,753 B2 * | 6/2004 | Nguyen et al. | ................... | 714/39 |
| 6,915,457 B1 * | 7/2005 | Miller | .............................. | 714/43 |
| 7,530,072 B1 * | 5/2009 | Cheaz | ........................... | 718/104 |
| 7,574,567 B2 * | 8/2009 | Wyman | ........................ | 711/141 |
| 7,823,021 B2 * | 10/2010 | Abe | ............................ | 714/38.1 |
| 8,086,910 B1 * | 12/2011 | Koktan et al. | ..................... | 714/52 |
| 8,103,905 B2 * | 1/2012 | Davis et al. | ..................... | 714/11 |
| 8,108,872 B1 * | 1/2012 | Lindholm et al. | ............ | 718/104 |
| 8,365,014 B2 | 1/2013 | Lynn | | |
| 2002/0120886 A1 * | 8/2002 | Nguyen et al. | ................... | 714/39 |
| 2002/0162053 A1 * | 10/2002 | Os | ..................................... | 714/38 |
| 2003/0226056 A1 * | 12/2003 | Yip et al. | .......................... | 714/4 |
| 2006/0020776 A1 * | 1/2006 | Yoshida | ......................... | 712/235 |
| 2006/0200702 A1 * | 9/2006 | Canning et al. | .................. | 714/38 |
| 2006/0271938 A1 * | 11/2006 | Gootherts et al. | ............ | 718/107 |
| 2007/0130324 A1 * | 6/2007 | Wang | .............................. | 709/224 |
| 2007/0220513 A1 * | 9/2007 | Hwang | .............................. | 718/1 |

(Continued)

OTHER PUBLICATIONS

Francis M. David, et al., "Improving Dependability by Revisiting Operating System Design", Proceedings of the 3$^{rd}$ Workshop on Hot Topics in System Dependability, Edinburgh, UK, Article No. 1 (2007), pp. 1-6.

*Primary Examiner* — Kamini Patel
(74) *Attorney, Agent, or Firm* — Harrity & Harrity, LLP

(57) ABSTRACT

A resource recovery system may maintain a counter in memory that indicates a number of times one or more threads of execution, which use shared resources, have crashed. The system may associate a first value of the counter with a resource allocated to a thread of the one or more threads, and may set an indicator associated with the thread to indicate whether the thread has crashed. The system may determine whether to re-allocate the resource to the thread based on the first value of the counter associated with the resource and based on the indicator associated with the thread.

20 Claims, 13 Drawing Sheets

(56) References Cited

U.S. PATENT DOCUMENTS

| | | | |
|---|---|---|---|
| 2007/0294584 A1* | 12/2007 | Jain et al. .......................... | 714/37 |
| 2008/0046782 A1* | 2/2008 | Betancourt et al. ............. | 714/38 |
| 2008/0126502 A1* | 5/2008 | Holt .............................. | 709/212 |
| 2009/0138670 A1* | 5/2009 | Mutlu et al. .................. | 711/167 |
| 2009/0240860 A1* | 9/2009 | Coon et al. .................... | 710/200 |
| 2010/0046375 A1 | 2/2010 | Goldstein et al. | |
| 2010/0325396 A1 | 12/2010 | Yoshida | |
| 2011/0320858 A1 | 12/2011 | Koktan et al. | |

* cited by examiner

FAST RESOURCE RECOVERY AFTER THREAD CRASH

RELATED APPLICATION

This application is a continuation of U.S. patent application Ser. No. 12/687,275, filed Jan. 14, 2010 (now U.S. Pat. No. 8,365,014), which is incorporated herein by reference.

BACKGROUND

Data processing systems, including computers and data routing/forwarding devices, typically implement multiple threads that operate upon multiple, shared resources. Each thread may include an independent thread of execution, such as an independent concurrently running task, that may utilize one or more resources of the shared resources. The resources may each include any type of software or hardware resource that either performs a function, or which can be used by a thread to perform a function. In a computer system, for example, a resource may include a region of memory or an object stored in the memory. In a data routing system, for example, a resource may include a packet (e.g., packet header and packet payload stored in memory).

In systems where multiple threads of execution share resources, having one of the multiple threads crash may cause the resources managed or owned by the thread to be left in an undefined state. This often results in a loss of those resources (e.g., a memory leak) or a larger system re-start (e.g., a re-boot) to return the system and all of its resources to a known state. Such a larger system re-start increases the system down time from the system user's standpoint. As the number of threads (or process instances sharing resources) in execution grows, this becomes an ever increasing problem. Furthermore, the use of multi-core architectures in existing data processing systems may necessitate the increased use of different threads of execution to take full advantage of the number of available Central Processing Units (CPUs). This increased use of different threads of execution may increase the risk of down time due to any one of the threads crashing. Larger platforms having more CPUs, to handle more traffic, will only make the problem worse in the future.

SUMMARY

In accordance with one embodiment, a method implemented by a resource recovery system may include maintaining a counter in memory that indicates a number of times one or more threads have crashed and determining, by the resource recovery system, whether at least one of the one or more threads has crashed. The method may further include using, based on the determination, the counter to determine whether to re-allocate resources to the one or more threads for thread crash recovery.

In another embodiment, a resource recovery system may include a memory storing a data array, and a thread crash counter to maintain a count of a number of times one or more threads of execution have crashed. The system may further include a resource recovery management unit to: determine whether at least one of the one or more threads has crashed, and use the counter to determine whether to perform a resource recovery process when at least one of the one or more threads has crashed.

In still another embodiment, a method implemented by a resource recovery system may include maintaining a counter in memory that indicates a number of times one or more threads of execution, which use shared resources, have crashed, and associating, by the resource recovery system, a first value of the counter with a resource allocated to a thread of the one or more threads. The method may further include setting an indicator associated with the thread to indicate whether the thread has crashed, and determining whether to re-allocate the resource to the thread based on the first value of the counter associated with the resource and based on the indicator associated with the thread.

In a further embodiment, a system may include a thread crash counter that indicates a number of times one or more threads, which use shared resources, have crashed. The system may further include a resource recovery management unit to: obtain a first value of the counter, associate the first value of the counter with a resource allocated to a thread of the one or more threads, set an indicator associated with the thread to indicate whether the thread has crashed, obtain a second value of the counter, where the second value of the counter is obtained at a different time than the first value of the counter is obtained, determine if the second value of the counter is greater than the first value of the counter, determine if the indicator associated with the thread indicates that the thread has crashed, and re-allocate the resource to the thread if the second value of the counter is greater than the first value of the counter and if the indicator indicates that the thread has crashed.

In yet another embodiment, a resource recovery system may include means for maintaining a counter that indicates a number of times one or more threads, which use shared resources, have crashed. The system may further include means for obtaining a first value of the counter when a resource of the shared resources is initially allocated to a thread of the one or more threads, means for associating the first value of the counter with the resource, and means for setting an indicator associated with the thread to indicate whether the thread has crashed. The system may also include means for determining whether to re-allocate the resource to the thread based on the first value of the counter associated with the resource and based on the indicator associated with the thread.

BRIEF DESCRIPTION OF THE DRAWINGS

The accompanying drawings, which are incorporated in and constitute a part of this specification, illustrate one or more embodiments described herein and, together with the description, explain the invention. In the drawings.

DETAILED DESCRIPTION

The following detailed description refers to the accompanying drawings. The same reference numbers may be used in different drawings to identify the same or similar elements. Also, the following detailed description does not limit the invention. Instead, the scope of the invention is defined by the appended claims and equivalents.

Exemplary embodiments described herein implement a thread crash recovery system that enables the recovery of resources in a system after one or more threads have crashed. The thread crash recovery system described herein uses a counter that maintains a count of a number of times any thread in the system has crashed. Each resource being utilized in the system, at the time the resource is allocated, may be tagged with a current value of the counter. The counter may be incremented each time that any thread in the system crashes. Additionally, each time a given thread crashes, a thread crash indicator associated with the thread is set to indicate that the thread is in a crashed state. The thread crash recovery system may implement a resource recovery process that re-allocates each resource to a thread based on a comparison between a current value of the counter and the counter value that the resource was tagged with, and further based on whether the thread's crash indicator indicates that the thread is currently in a crashed state.

Exemplary Environment

Figure 1:
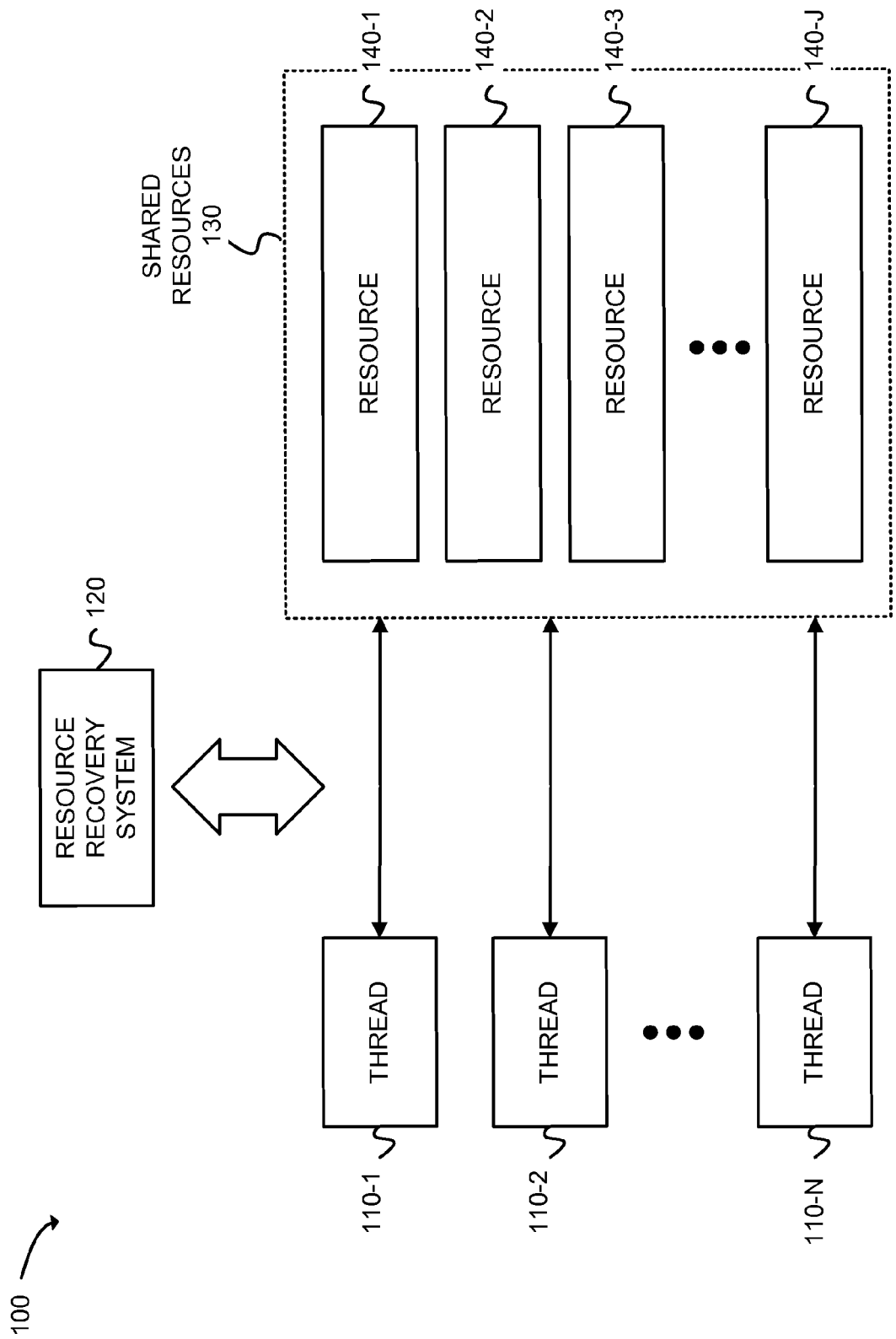
FIG. 1 is a diagram of an environment, according to an exemplary embodiment, in which multiple different threads may utilize resources from a pool of shared resources.

FIG. 1 is a diagram of an environment 100, according to an exemplary embodiment, in which multiple different threads may utilize resources from a pool of shared resources. Environment 100 may include multiple threads 110-1 through 110-N, a resource recovery system 120, and shared resources 130. Each of threads 110-1 through 110-N may include an independent thread of execution (e.g., an independent concurrently running task) that may be executed by a device and/or process (not shown) to utilize one or more resources of shared resources 130.

Resource recovery system 120 may include functionality for recovering resources of shared resources 130 when one or more of threads 110-1 through 110-N crashes. A thread crashes when it completely stops performing its expected operation or function, and also stops responding and/or interacting in environment 100 in an expected manner. A thread may be considered to be in a "crashed" state during a period in which the thread stops performing its expected operation or function, and in which the thread stops responding and/or interacting in environment 100 in the expected manner. In some embodiments, resource recovery system 120 may be implemented by an operating system (e.g., a system Kernel). Threads 110-1 through 110-N, as depicted in FIG. 1, may include threads that are in the process of executing tasks that use, or interact with, one or more resources of shared resources 130.

Shared resources 130 may include multiple resources 140-1 through 140-J. Each of multiple resources 140-1 through 1404 may include any type of software or hardware resource that either performs a function or which can be used in a process of performing a function. In some embodiments, each of resources 140-1 through 140-J may include a region of memory or an object stored in memory. In another embodiment, each of resources 140-1 through 140-J may include data stored in memory (e.g., metadata packet header and packet payload data stored in memory).

Exemplary Devices

Figure 2:
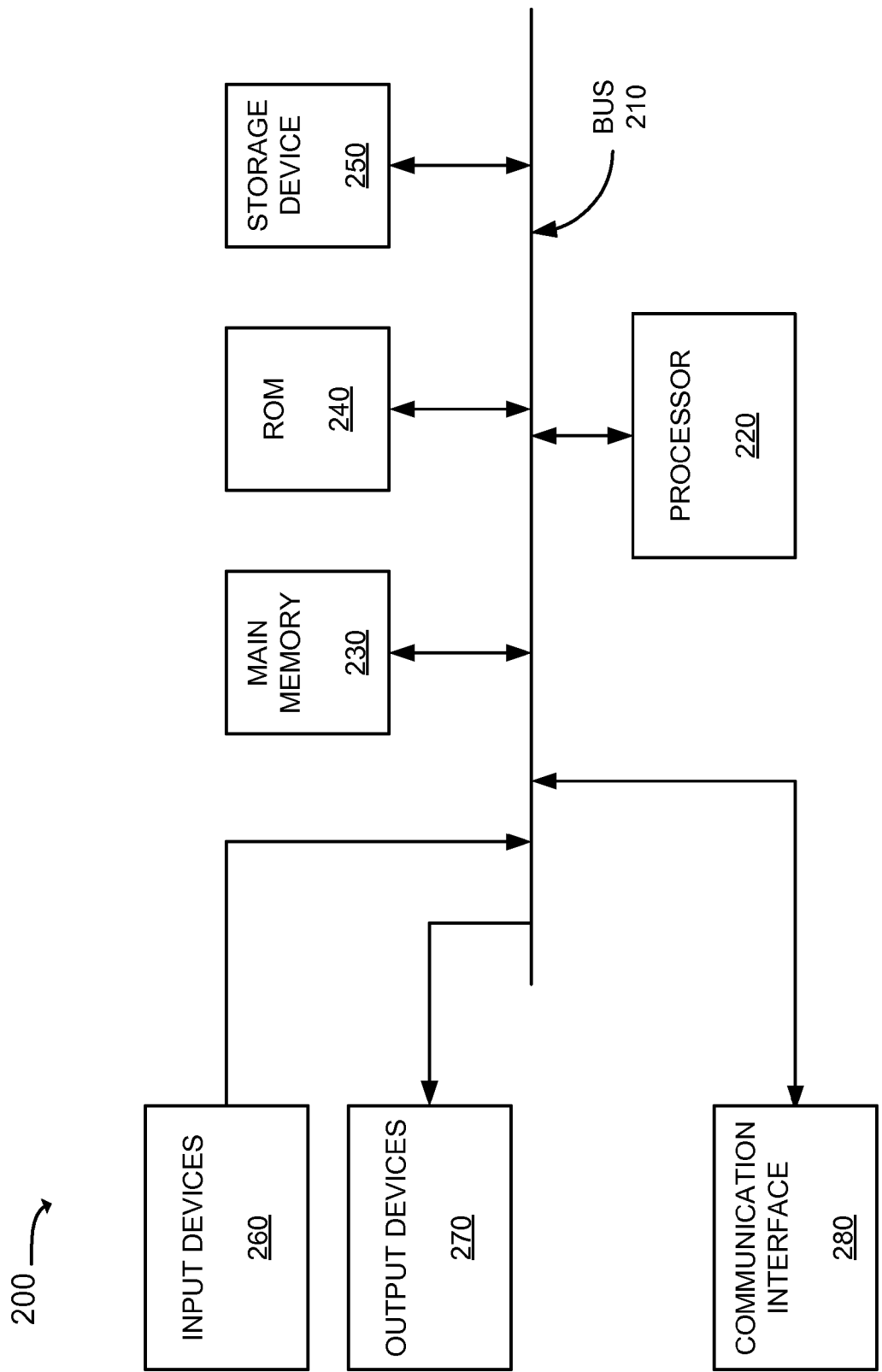
FIG. 2 is a diagram of components of a device, of one exemplary embodiment, in which the environment of FIG. 1 may be implemented.

FIG. 2 is a diagram of components of a device 200, of one exemplary embodiment, in which the exemplary environment 100 of FIG. 1 may be implemented. In the exemplary embodiment of FIG. 2, environment 100 may be implemented within a computational device that may execute one or more processes to process and handle data. Device 200 may include, for example, a desktop, palmtop or laptop computer. Device 200 may include a bus 210, a processor 220, a main memory 230, a read only memory (ROM) 240, a storage device 250, input device(s) 260, output device(s) 270, and a communication interface 280. Bus 210 may include a path that permits communication among the components of device 200.

Processor 220 may include, for example, a processor, microprocessor, and/or processing logic that may interpret and execute instructions. In some implementations, processor 220 may include multiple processors (e.g., parallel processors). Main memory 230 may include a random access memory (RAM) or another type of dynamic storage device that may store information and instructions for execution by processor 220. ROM 240 may include a ROM device or another type of static storage device that may store static information and instructions for use by processor 220. Storage device 250 may include a magnetic and/or optical recording medium and its corresponding drive.

Input device(s) 260 may include one or more mechanisms that permit an operator to input information to device 200, such as a keyboard, a mouse, a pen, voice recognition and/or biometric mechanisms, etc. Output device(s) 270 may include one or more mechanisms that output information to the operator, including a display, a printer, a speaker, etc. Communication interface 280 may include any transceiver-like mechanism that enables device 200 to communicate with other devices and/or systems.

Device 200 may perform certain operations or processes, as will be described in detail below. Device 200 may perform these operations in response to processor 220 executing software instructions contained in a computer-readable medium, such as memory 230. A computer-readable medium may be defined as a physical or logical memory device. A logical memory device may include memory space within a single physical memory device or spread across multiple physical memory devices.

The software instructions may be read into memory 230 from another computer-readable medium, such as storage device 250, or from another device via communication interface 280. The software instructions contained in memory 230 may cause processor 220 to perform operations or processes that will be described later. Alternatively, hardwired circuitry may be used in place of or in combination with software instructions to implement processes consistent with the principles of the invention. Thus, exemplary implementations are not limited to any specific combination of hardware circuitry and software.

The components depicted in FIG. 2 are exemplary. Fewer, more, or differently arranged components than those shown may be included in device 200.

Figure 3:
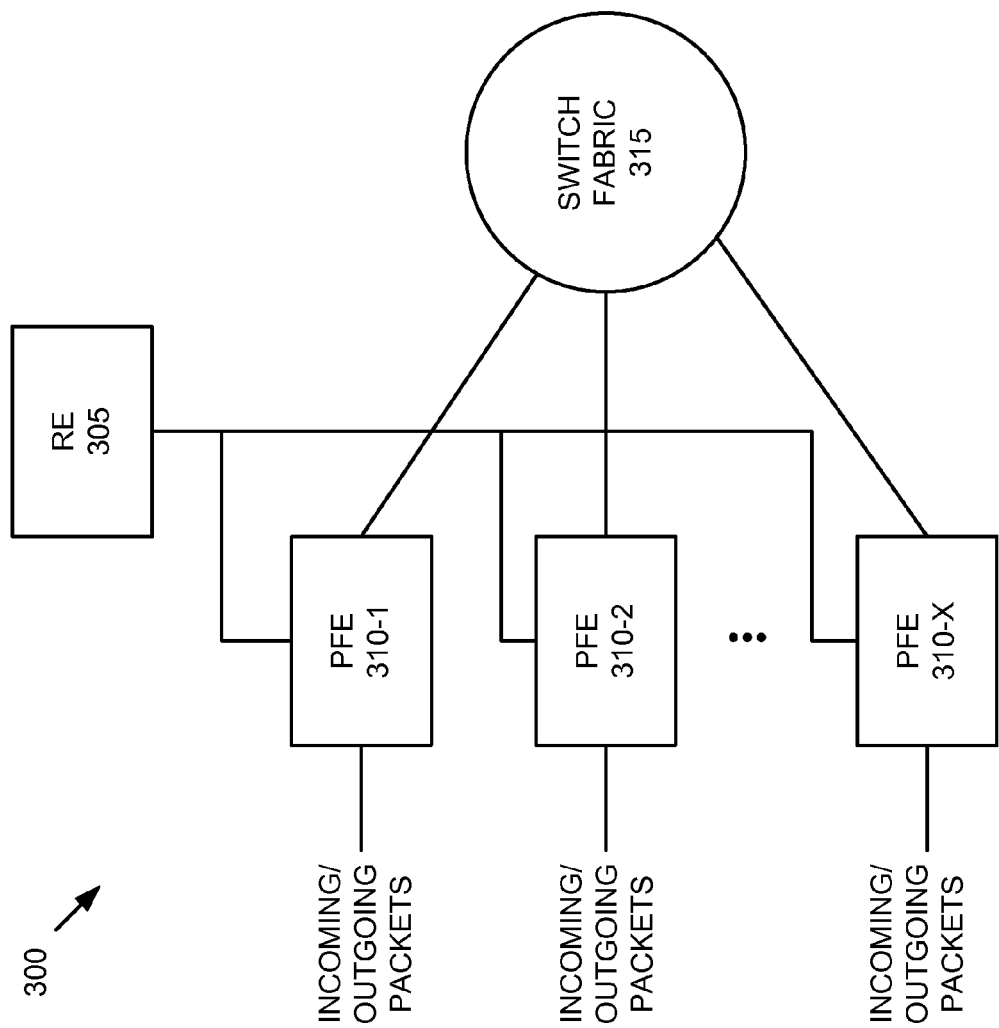
FIG. 3 is a diagram of components of a device, of another exemplary embodiment, in which the environment of FIG. 1 may be implemented in a network device that acts as a switch for forwarding packets or other types of data units.

FIG. 3 is a diagram depicting another exemplary embodiment, in which the environment 100 of FIG. 1 may be implemented in a network device 300 that acts as a switch or router for forwarding packets, or other types of data units. In the exemplary embodiment of FIG. 3, environment 100 may be implemented within one or more packet forwarding engines (PFEs), or routing engines (REs), within device 300. In the exemplary embodiment depicted in FIG. 3, device 300 may take the form of a router. The router may receive one or more data streams from a physical link, process the data stream(s) to determine destination information, and transmit the data stream(s) on one or more links in accordance with the destination information.

Device 300 may include a routing engine (RE) 305 and multiple packet forwarding engines (PFEs) 310-1 through 310-X interconnected via a switch fabric 315. Switch fabric 315 may include one or more switching planes to facilitate communication between two or more of PFEs 310. In one exemplary embodiment, each of the switching planes may include a three-stage switch of crossbar elements.

RE 305 may include processing logic that performs high-level management functions for device 300. For example, RE 305 may communicate with other networks and systems connected to device 300 to exchange information regarding network topology. RE 305 may create routing tables based on the network topology information and forwarding tables based on the routing tables. RE 305 may install the forwarding tables in PFEs 310. PFEs 310 may use the forwarding tables to perform route lookup for incoming packets. RE 305 may also perform other general control and monitoring functions for device 300.

Each of PFEs 310 may connect to RE 305 and switch fabric 315. PFEs 310 may receive data on physical links connected to a network, such as a wide area network (WAN), local area network (LAN), or a wireless network. Each physical link could be one of many types of transport media, such as optical fiber or Ethernet cable. The data on the physical link may be formatted according to one of several protocols, such as the synchronous optical network (SONET) standard, asynchronous transfer mode (ATM) technology, or Ethernet.

In the exemplary embodiment of FIG. 3, incoming packets may be stored in a memory (not shown) as "shared resources" which may be used and/or operated upon by various threads being executed by RE 305 or PFEs 310-1 through 310-X.

The components depicted in FIG. 3 are exemplary. Fewer, more, or differently arranged components than those shown may be included in network device 300.

Resource Recovery System

Figure 4:
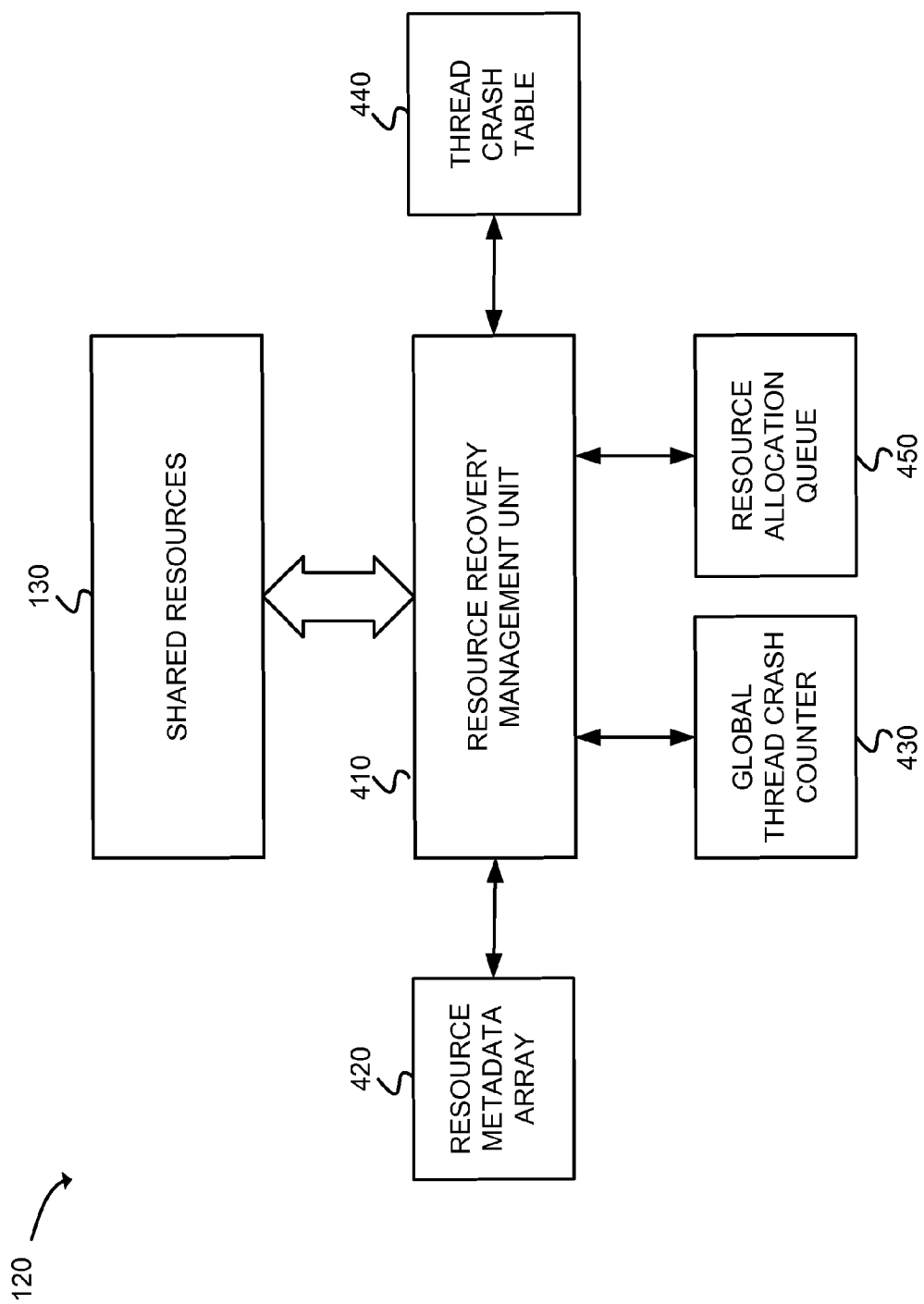
FIG. 4 is an exemplary diagram of the resource recovery system of FIG. 1.

FIG. 4 is an exemplary diagram of resource recovery system 120 of FIG. 1. Resource recovery system 120 may include a resource recovery management unit 410, shared resources 130, a resource metadata array 420, a global thread crash counter 430, a thread crash table 440 and a resource allocation queue 450. Metadata array 420, global thread crash counter 430, thread crash table 440 and queue 450 may be stored in a memory (not shown) (e.g., memory 230 of FIG. 2).

Resource management unit 410 may operate, in conjunction with global thread crash counter 430, thread crash table 440 and resource allocation queue 450, to recover one or more resources of shared resources 130 when at least one of threads 110-1 through 110-N crashes.

Resource metadata array 420 may store an array of metadata, where each section of metadata stored in array 420 may be associated with a single resource of shared resources 130. Resource metadata may be stored in array 420, and retrieved from array 420, by resource recovery management unit 410.

Global thread crash counter 430 may maintain a counter value that indicates a number of times any thread, which utilizes one or more of the resources of shared resources 130, has crashed. The counter value stored in global thread crash counter 430 may, thus, maintain a cumulative count of a number of times that any one of threads 110-1 through 110-N has crashed.

Thread crash table 440 may store thread identifiers, associated with each of threads 110-1 through 110-N, in conjunction with thread crash indicators that indicate whether a corresponding thread is currently in a "crashed" state. Thread crash table 440, therefore, maintains a record of which of threads 110-1 through 110-N are in a "crashed" state.

Resource allocation queue 450 may temporarily store metadata associated with a resource subsequent to a request for that resource by a thread, or subsequent to a thread crashing that was utilizing the resource. Resource recovery management unit 410 may, during a resource recovery process, retrieve a resource's metadata from queue 450 when the resource is ready to be allocated (or re-allocated in the case of a thread crash) to a thread.

The components depicted in FIG. 4 are exemplary. Fewer, more, or differently arranged components than those shown may be included in resource recovery system 120.

Exemplary Thread Crash Table

Figure 5:
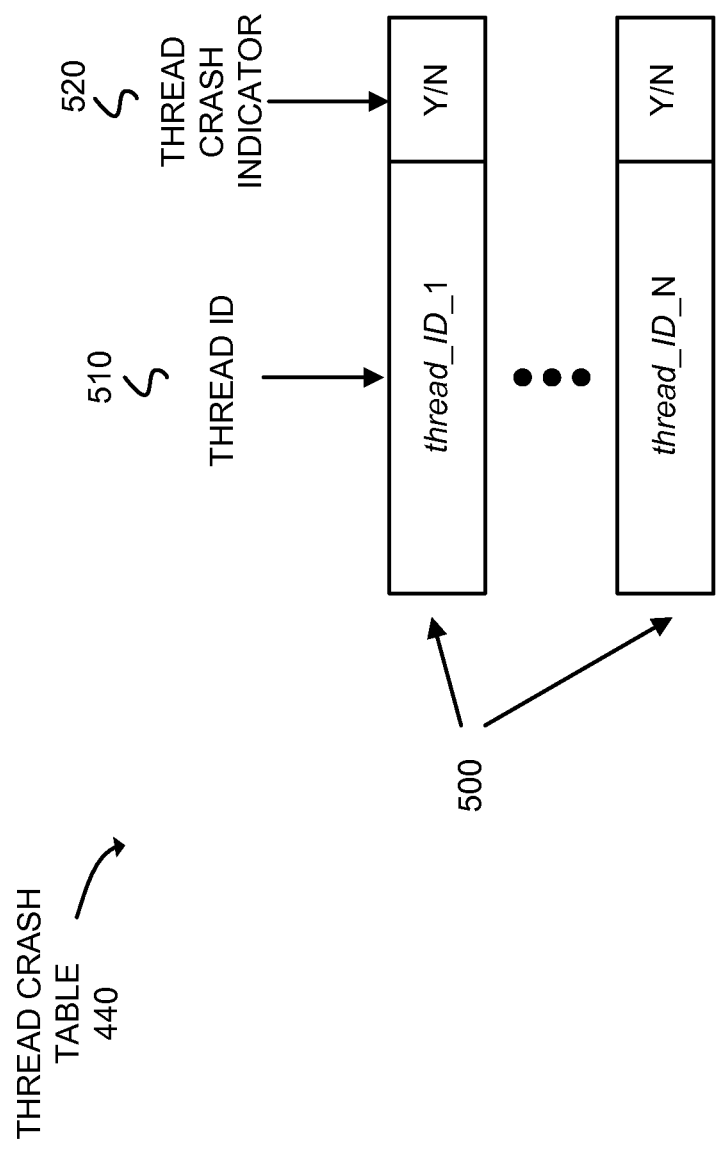
FIG. 5 is a diagram of the thread crash table of the resource recovery system of FIG. 4 according to an exemplary embodiment.

FIG. 5 is a diagram of thread crash table 440 according to an exemplary embodiment. Thread crash table 440 may include multiple entries 500, each of which may include a thread identifier (ID) field 510 and a thread crash indicator field 520. Thread ID field 510 may uniquely identify a particular one of threads 110-1 through 110-N. Thread crash indicator field 520 may indicate whether the thread identified in thread ID field 510 has crashed (i.e., is currently in a crashed state).

The fields depicted in FIG. 5 are exemplary. Fewer, more, or different fields than those shown may be included in table 440.

Exemplary Resource Allocation Queue

Figure 6:
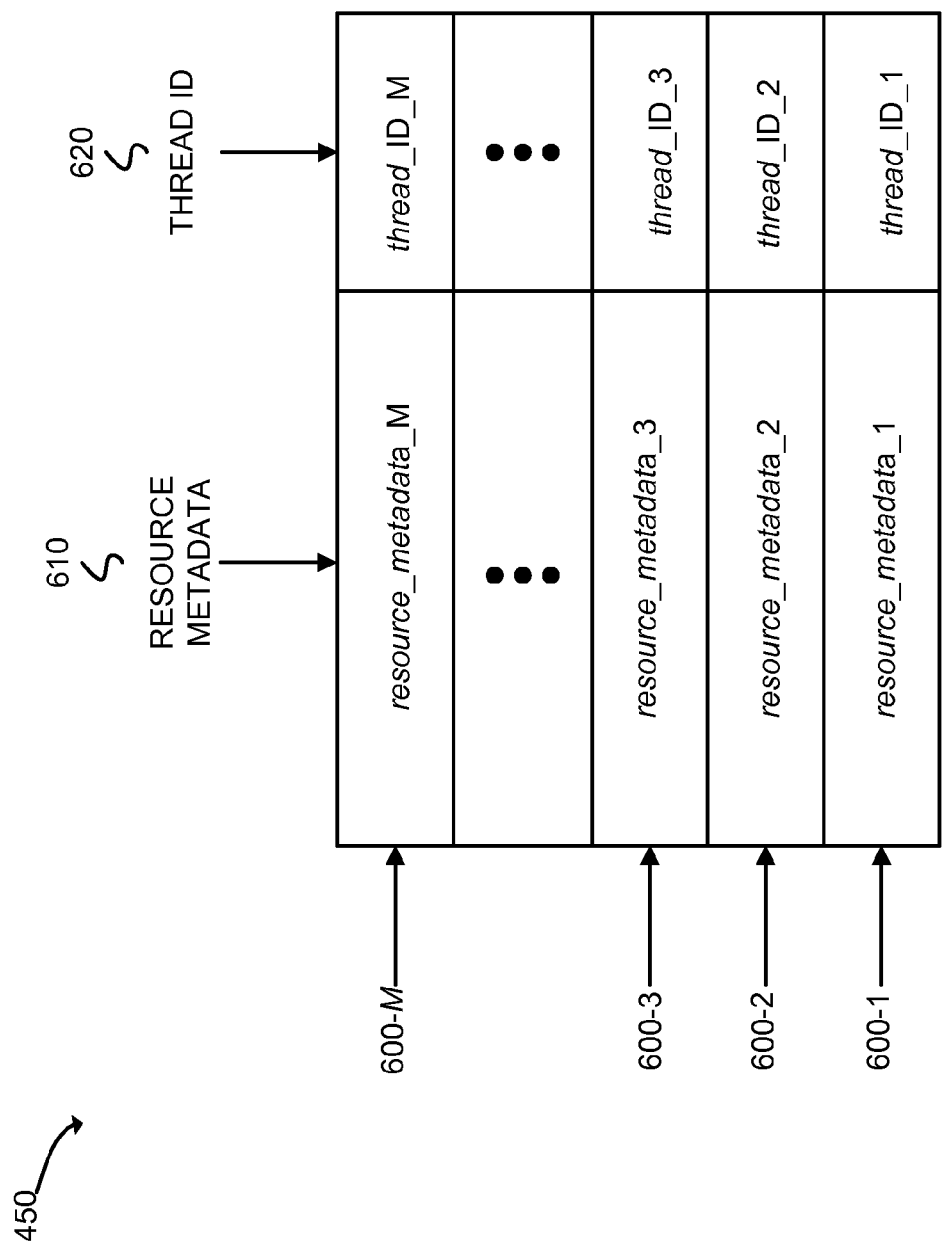
FIG. 6 is a diagram of the resource allocation queue of the resource recovery system of FIG. 4 according to an exemplary embodiment.

FIG. 6 is a diagram of resource allocation queue 450 according to an exemplary embodiment. Resource allocation queue 450 may store multiple items of resource metadata 600-1 through 600-M, received from resource allocation unit 410, for resource recovery. Each resource metadata 610 stored in allocation queue 450 may be associated with a thread ID field 620 that indicates which thread of threads 110-1 through 110-N may be requesting use of the resource associated with the respective resource metadata 610 (or was allocated the resource prior to the thread crashing). Resource metadata 610 may be stored in resource allocation queue 450 until the respective resource is allocated (or re-allocated in the case of a thread crash) to the thread identified by thread ID field 620.

The fields depicted in FIG. 6 are exemplary. Fewer, more, or different fields than those shown may be included in queue 450.

Exemplary Resource Metadata Array

Figure 7:
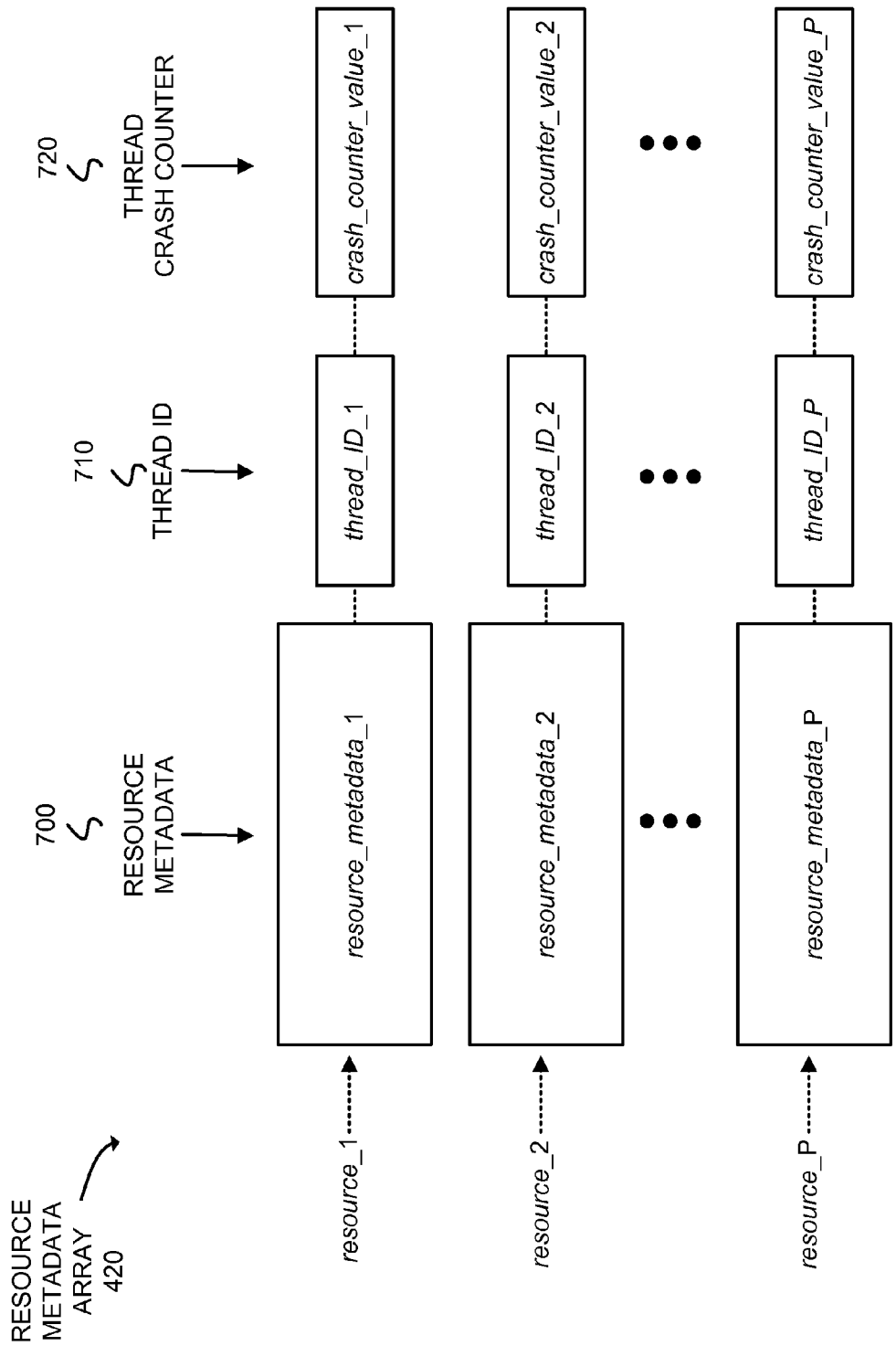
FIG. 7 is a diagram of the resource metadata array of the resource recovery system of FIG. 4 according to an exemplary embodiment.

FIG. 7 is a diagram of resource metadata array 420 according to an exemplary embodiment. Resource metadata array 420 may include an array of data, where a different resource in array 420 may be associated with respective resource metadata 700, a thread ID 710, and a thread crash counter 720.

Resource metadata 700 may store metadata associated with a particular resource. For example, if the resource includes a packet, the metadata may include packet header metadata from the packet. Thread ID field 710 may identify a thread that is currently allocated to the resource associated with a respective resource metadata 700. Thread crash counter field 720 may store a value for the global thread crash counter obtained at an approximate time when a resource's metadata is stored in metadata array 420 (i.e., approximately when the resource is allocated to a thread identified in thread ID field 710).

The fields depicted in FIG. 7 are exemplary. Fewer, more, or different fields than those shown may be included in array 420.

Exemplary Resource Data Reception Process

Figure 8:
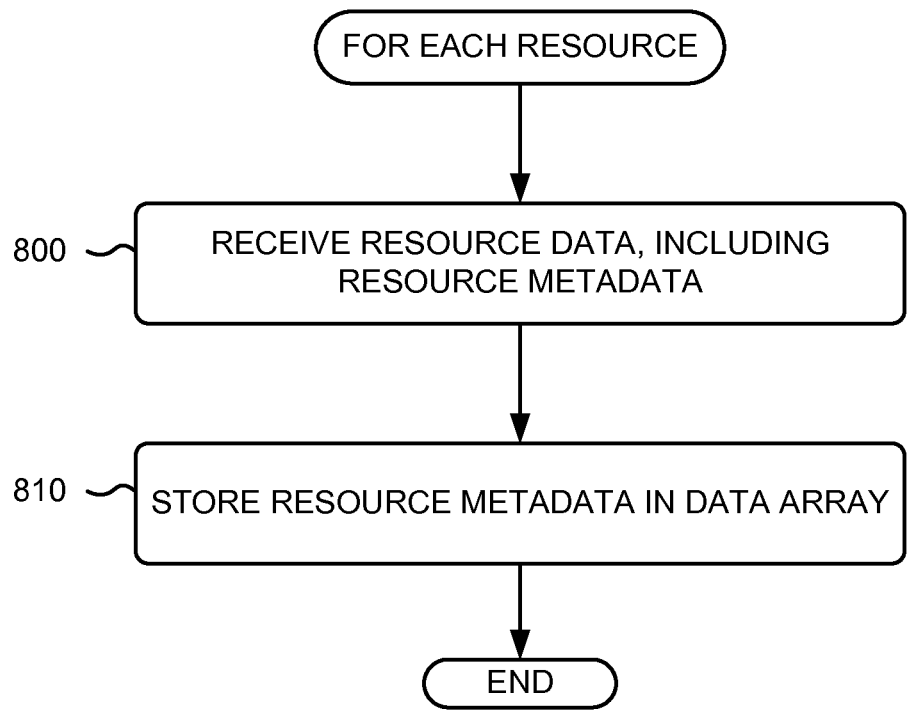
FIG. 8 is flow chart that illustrates an exemplary process for receiving and storing data associated with a resource.

FIG. 8 is a flow chart that illustrates an exemplary process for receiving and storing data associated with a resource. The exemplary process of FIG. 8 may be performed by resource recovery management unit 410 of resource recovery system 120 for each resource of shared resources 130. In other embodiments, some or all of the blocks described below may be performed by another component, unit or device, or a combination of components, units, or devices.

The exemplary process may include receiving resource data, including resource metadata (block 800). When a given resource is identified, resource recovery system 120 may receive the resource's metadata. For example, if a given resource is a packet, resource recovery system 120 may obtain the packet's header metadata when a packet is received at device 300.

The received resource metadata may be stored in resource metadata array 420 (block 810). Resource recovery system 120 may store the received metadata associated with a particular resource in resource metadata 700 of resource metadata array 420. For example, if a given resource is a packet, resource recovery system 120 may store the packet's header metadata in resource metadata 700 of array 420.

The exemplary process of FIG. 8 may be selectively repeated by resource recovery system 120 for each resource of shared resources 130.

Exemplary Crashed Thread Re-start Process

Figure 9:
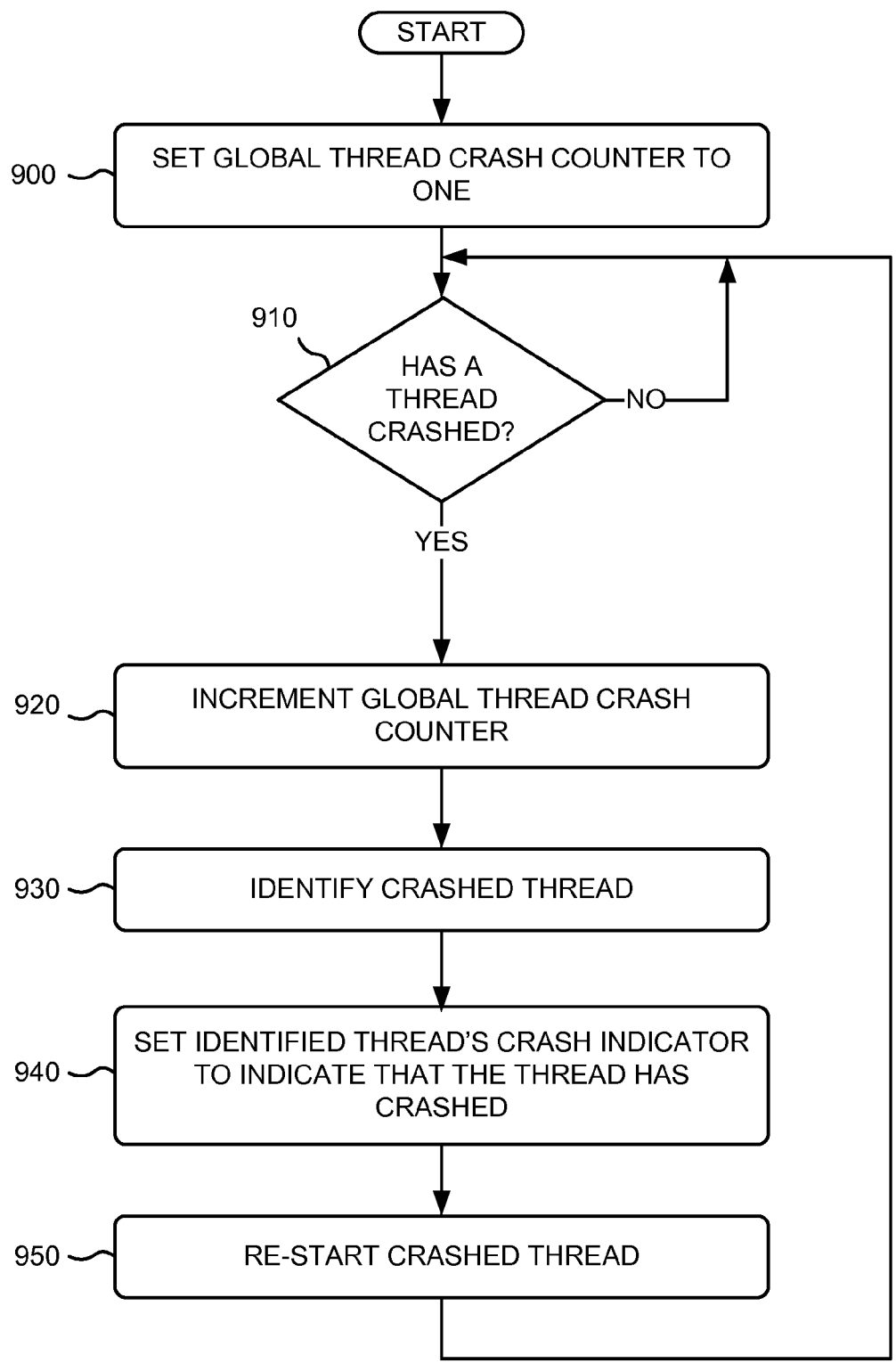
FIG. 9 is a flow chart that illustrates an exemplary process for re-starting a thread that has crashed.

FIG. 9 is a flow chart that illustrates an exemplary process for re-starting a thread that has crashed. The exemplary process of FIG. 9 may be performed by resource recovery management unit 410 of resource recovery system 120. In other embodiments, some or all of the blocks described below may be performed by another component, unit or device, or a combination of components, units, or devices.

The exemplary process may include setting the global thread crash counter to one (block 900). At the time of system initialization or re-boot, global thread crash counter 430 may be set to an initial value of one. Subsequent to initialization, global thread crash counter 430 may be incremented each time a thread crash is detected by resource recovery management unit 410, as described further below.

It may be determined whether a thread has crashed (block 910). Resource recovery management unit 410 of resource recovery system 120 may monitor threads 110-1 through 110-N to identify whether any of the threads has crashed. If a thread has not crashed (block 910—NO), then the process may return to block 910 (i.e., loop at block 910). If, on the other hand, a thread has crashed (block 910—YES), global thread crash counter 430 may be incremented (block 920). Upon detection of a thread crash of any of threads 110-1 through 110-N, resource recovery management unit 410 of resource recovery system 120 may increment a current counter value stored in global thread crash counter 430 by one (i.e., counter=counter+1). The crashed thread may be identified (block 930) and the identified thread's crash indicator may be set to indicate that the thread has crashed (block 940). Resource recovery management unit 410 may identify the thread ID, of the particular thread of threads 110-1 through 110-N, that has crashed and may determine an entry 500 in thread crash table 440 whose thread ID field 510 matches the identified thread ID. Resource recovery management unit 410 may set thread crash indicator 520 of the determined entry 500 to indicate that the thrash has crashed (e.g., thread crash indicator set to one).

The crashed thread may be re-started (block 950). Resource recovery management unit 410 may initiate a thread re-start that begins a process of re-allocating previously allocated resources to the crashed thread. Thread re-allocation is described in further detail below with respect to FIGS. 11A-11C.

Blocks 920 through 950 may be selectively repeated for each identified thread that crashes in environment 100.

Exemplary Resource Allocation Process

Figure 10:
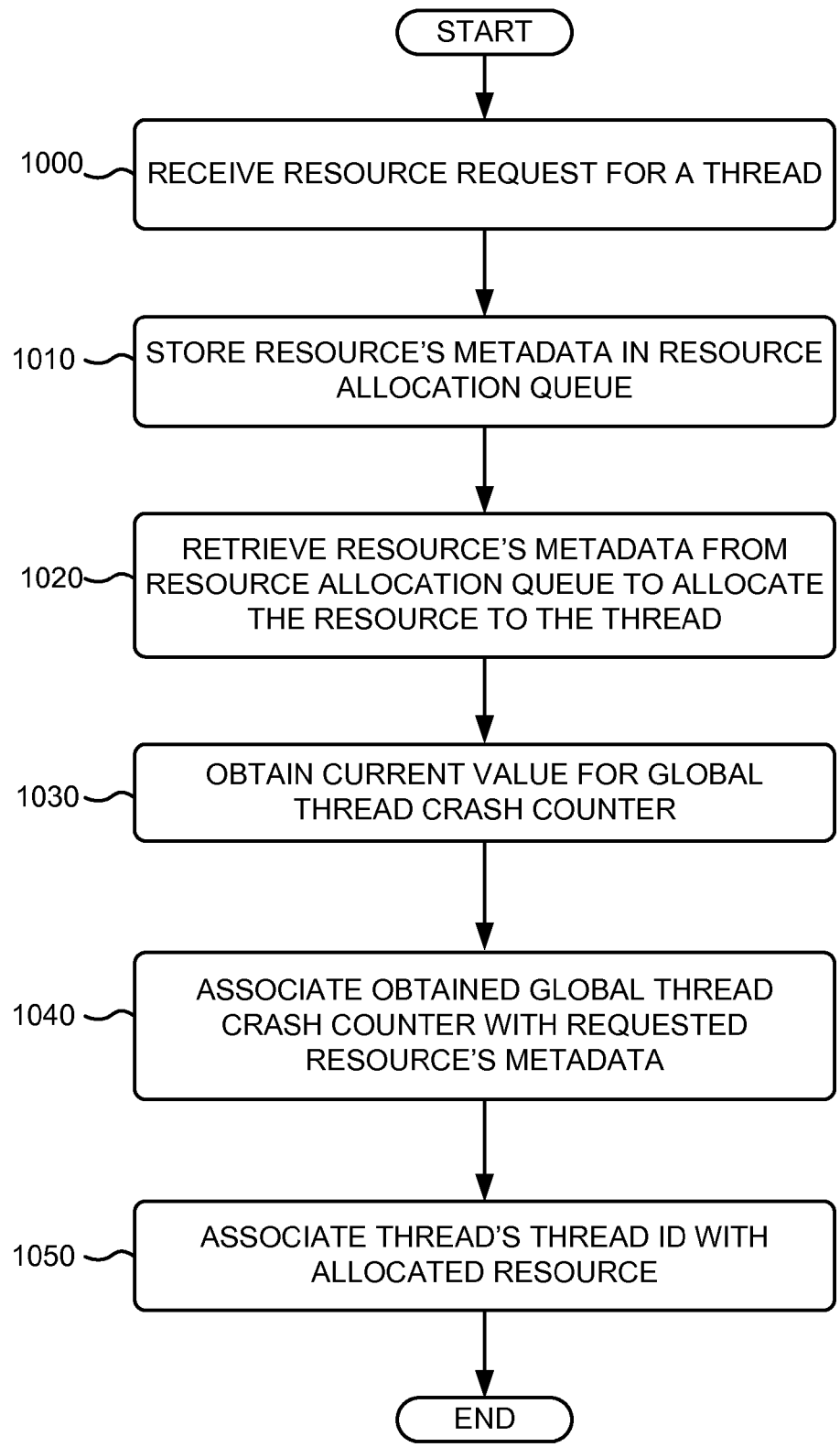
FIG. 10 is a flow chart that illustrates an exemplary process for allocating resources to threads.

FIG. 10 is a flow chart that illustrates an exemplary process for allocating resources to threads. The exemplary process of FIG. 10 may be performed by resource recovery management unit 410 of resource recovery system 120. In other embodiments, some or all of the blocks described below may be performed by another component, unit or device, or a combination of components, units, or devices.

The exemplary process may include receiving a resource request for a thread (block 1000). One of threads 110-1 through 110-N may request a particular resource whose metadata may be stored in resource metadata array 420. The requested resource's metadata may be stored in resource allocation queue 450 (block 1010). Resource allocation queue 450 may queue resources for allocation to a particular thread. Resource recovery management unit 410 may retrieve the requested resource's metadata from metadata array 420 and may store the retrieved metadata in queue 450 along with the requesting thread's thread ID. Resource recovery management unit 410 may subsequently retrieve metadata 610 and thread ID 620 from queue 450 for allocating the corresponding resource to the thread identified by thread ID 620. Resource recovery management unit 410 may retrieve entries 600 from queue 450 based on various mechanisms, such as, for example, based on a first-come, first-served mechanism, based on priorities assigned to each of the threads or to each of the resources, etc.

A current value for the global thread crash counter may be obtained (block 1030) and the obtained global thread crash counter may be associated with the requested resource's metadata (block 1040). Resource recovery management unit 410 may obtain a current counter value from global thread crash counter 430 and may store the counter value in thread crash counter field 720 associated with the resource's metadata in array 420. The thread's thread ID may be associated with the allocated resource (block 1050). Resource recovery management unit 410 may store the thread's thread ID in thread ID field 710 associated with the resource's metadata in array 420.

The exemplary process of FIG. 10 may be executed for each resource request received for any one of threads 110-1 through 110-N.

Exemplary Resource Recovery Process

Figure 11A:
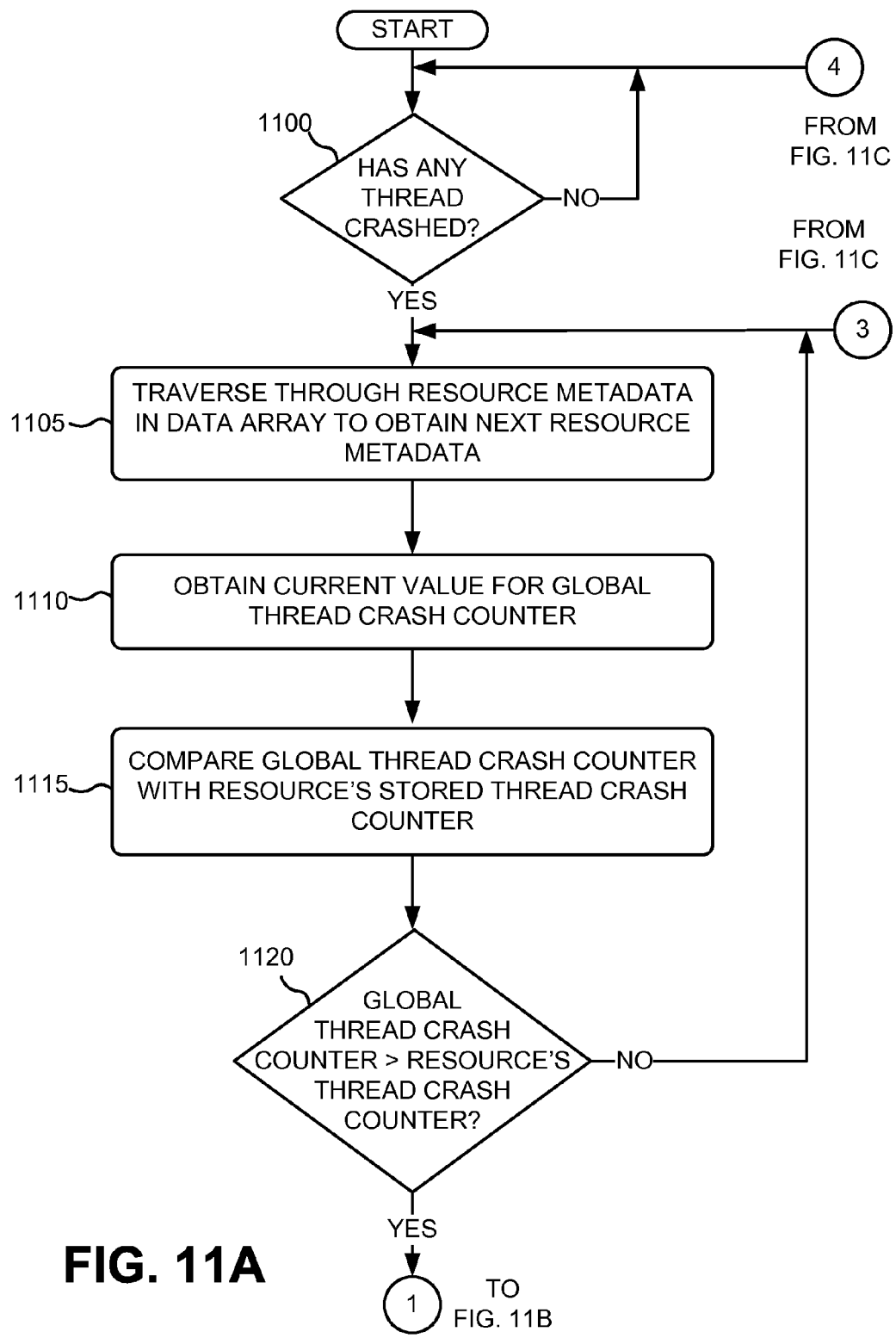
FIGS. 11A-11C are flow charts that illustrate an exemplary process for recovering resources subsequent to thread crashes.
Figure 11B:
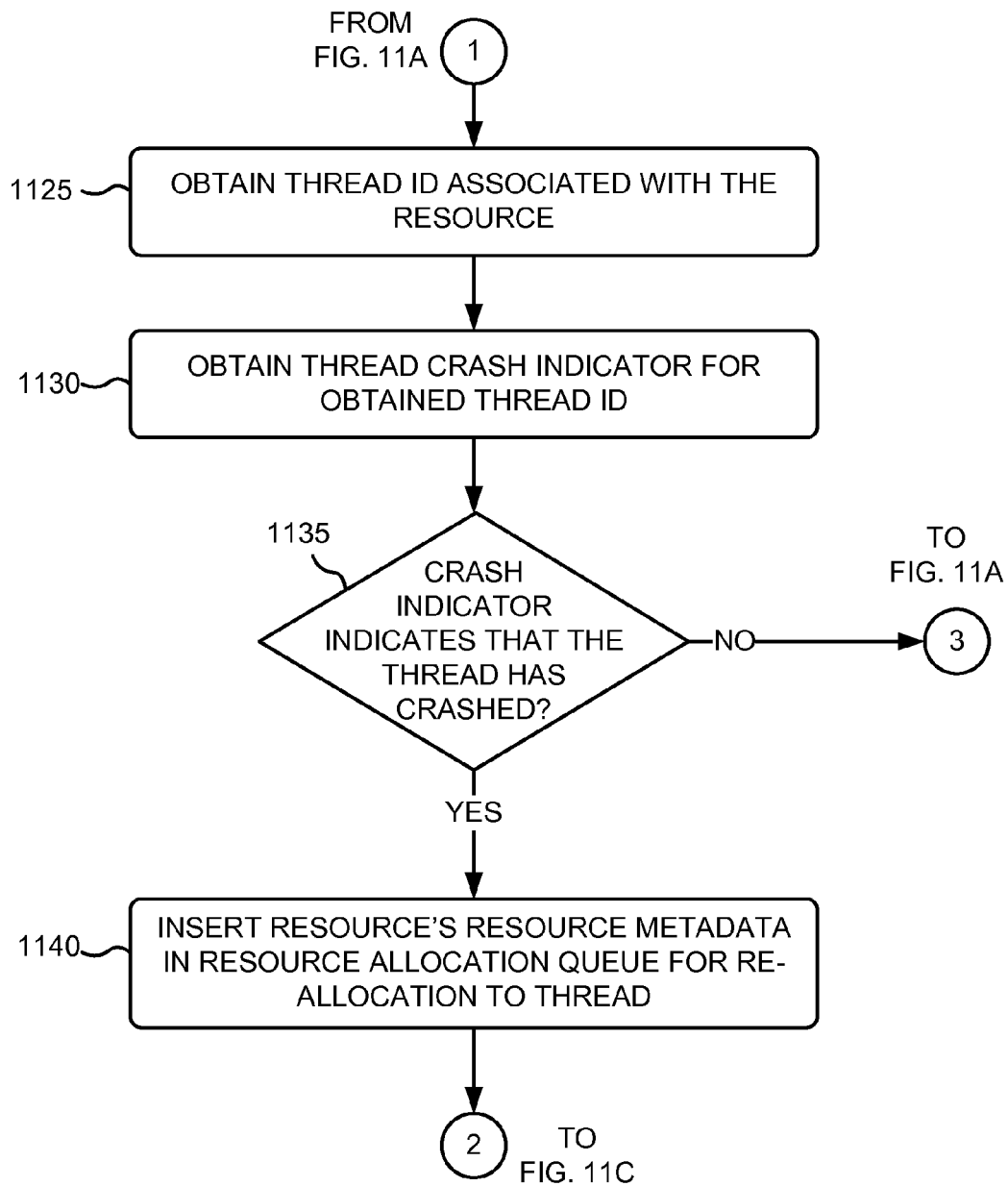
Figure 11C:
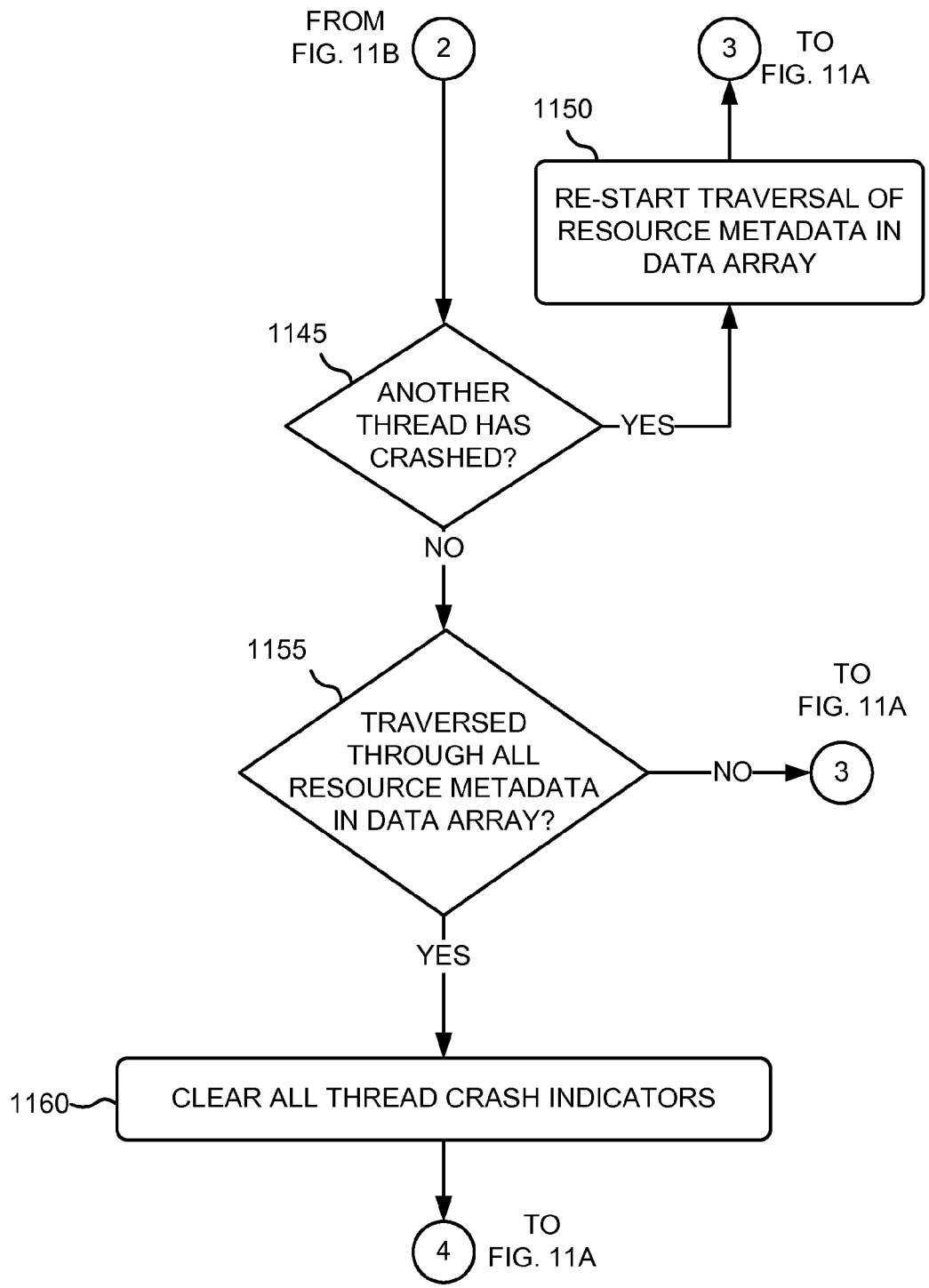

FIGS. 11A-11C are flow charts that illustrate an exemplary process for recovering resources subsequent to thread crashes. The exemplary process of FIGS. 11A-11C may be performed by resource recovery management unit 410 of resource recovery system 120. In other embodiments, some or all of the blocks described below may be performed by another component, unit or device, or a combination of components, units, or devices.

The exemplary process may include determining whether any thread has crashed (block 1100). Resource recovery management unit 410 may monitor threads 110-1 through 110-N to identify whether any of the threads has crashed. If no thread has crashed, the exemplary process may continue to loop at block 1100 with the continued monitoring of threads 110-1 through 110-N. If any thread has crashed (block 1100—YES), then the resource metadata in the data array may be traversed to obtain a next item of resource metadata (block 1105). In the case of a first execution of block 1105 in the exemplary process, the "next item" of resource metadata may include the first item of resource metadata in the data array. Resource recovery management unit 410 may traverse resource metadata array 420 in a step-by-step manner such that each resource's metadata in array 420 is successively analyzed to determine if a respective resource needs to be recovered.

A current value for the global thread crash counter may be obtained (block 1110). Resource recovery management unit 410 may retrieve a current counter value from global thread crash counter 430. The obtained global thread crash counter may be compared with the resource's stored thread crash counter (block 1115). Resource recovery management unit 410 may retrieve the resource's thread crash counter value 720 from array 420 and compare the value with the value of global thread crash counter 430 obtained in block 1110.

It may be determined whether the global thread crash counter is greater than the resource's thread crash counter (block 1120). If not (block 1120—NO), the exemplary process may return to block 1105, with a traversal to a next resource metadata in array 420. If the global thread crash counter is greater than the resource's thread crash counter (block 1120—YES), then a thread ID associated with the resource may be obtained (block 1125).

The thread crash indicator for the thread ID may be obtained (block 1130). Resource recovery management unit 410 may obtain the resource's thread ID 710 from array 420, and then match the thread ID 710 with a thread ID 510 in an entry 500 of thread crash table 440. Resource recovery management unit 410 may retrieve crash indicator 520 from the entry 500 having a matching thread ID.

It may be determined whether the obtained thread crash indicator indicates that the thread has crashed (block 1135). Resource recovery management unit 410 may analyze the obtained thread crash indicator 520 to determine whether it is set (e.g., set equal to one), indicating a thread crash, or cleared (e.g., set equal to zero), indicating that the thread is not in a "crashed" state. If the thread crash indicator does not indicate that the thread has crashed (block 1135—NO), then the exemplary process may return to block 1105 with a traversal to a next resource metadata in array 420. If the thread crash indicator indicates that the thread has crashed (block 1135—YES), then the resource's resource metadata may be inserted in resource allocation queue 450 (block 1140). Resource recovery management unit 410 may subsequently retrieve metadata 610 and thread ID 620 from queue 450 for re-allocating the corresponding resource to the thread identified by thread ID 620. Resource recovery management unit 410 may retrieve entries 600 from queue 450 based on various mechanisms, such as, for example, based on a first-come, first-served mechanism, based on priorities assigned to each of the threads or to each of the resources, etc. Alternatively, instead of re-allocating the resource to the thread after the thread has crashed, the resource may be "freed" up, and returned to a pool of available resources, for use in the future.

It may be determined if another thread has crashed (block 1145). If so (block 1145—YES), then a traversal of resource metadata in data array 420 may be re-started (block 1150) and the exemplary process may return to block 1105 with traversal of array 420 re-starting at the first item of resource metadata in array 420. Resource recovery management unit 410 may then traverse resource metadata array 420 in a step-by-step manner, from the first item of resource metadata, such that each resource's metadata in array 420 is successively analyzed to determine if a respective resource needs to be recovered.

It may be determined if all resource metadata in resource metadata array 420 has been traversed (block 1155). If not (block 1155—NO), then the exemplary process may return to block 1105 with a traversal to a next resource metadata in array 420. If all resource metadata in resource metadata array 420 has been traversed (block 1155—YES), then all thread crash indicators may be cleared (block 1160). The exemplary process may return to block 1100 to determine if any additional threads have crashed.

The exemplary process of FIGS. 11A-11C. as described above, traverses through all of the resource metadata in metadata array 420 before clearing all of the thread crash indicators. However, alternatively, resources may be recovered and re-started a few at a time, with each crashed thread re-starting almost immediately. The resource metadata traversal of FIGS. 11A-11C may be executed slowly as a background process (i.e., so as to not "hog" processing resources), or may be executed completely over small time slices.

CONCLUSION

As described herein, a thread crash recovery system may enable the recovery of resources in a system after one or more threads have crashed. The thread crash recovery system may enable the recovery of all resources used by a crashed thread without incurring a large cost on other threads in the system and without imposing any substantial "housekeeping" requirements on the system. The thread crash recovery system may re-start a crashed thread quickly, even before all packets for that thread may have been recovered.

The foregoing description of embodiments described herein provides illustration and description, but is not intended to be exhaustive or to limit the embodiments described herein to the precise form disclosed. Modifications and variations are possible in light of the above teachings or may be acquired from practice of the invention.

While series of blocks have been described in FIGS. 8-10, and 11A-11C, the order of the blocks may vary in other implementations. Also, non-dependent blocks may be performed in parallel. Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise. The scope of the invention is defined by the claims and their equivalents.

What is claimed:
1. A method comprising:
receiving, by a device, a resource request for a thread, of a plurality of threads, associated with the device;
storing, by the device and in a queue for allocating resources to the thread, metadata associated with a resource corresponding to the resource request and information identifying the thread;
retrieving, by the device, the metadata and the information from the queue to allocate the resource to the thread;
associating, by the device, a first value with the metadata, the first value corresponding to a value of a counter at a time that the resource is allocated to the thread, and the value of the counter being incremented each time any of the plurality of threads crashes; and
re-allocating, by the device and when the thread crashes, the resource to the thread based on associating the first value with the metadata.
2. The method of claim 1, where the resource includes a data unit received by the device from another device via a network, and
where storing the metadata associated with the resource and the information identifying the thread includes:
storing metadata associated with a header of the data unit and the information identifying the thread in the queue for allocating resources to the thread.
3. The method of claim 1, further comprising:
incrementing, when the thread crashes, the value of the counter from the first value to a second value; and
where re-allocating the resource to the thread includes:
determining, when the thread crashes, that:
the resource is allocated to the thread,
the resource is associated with the first value, and
the first value is less than the second value, and
re-allocating the resource to the thread based on the first value being less than the second value.
4. The method of claim 1, further comprising:
determining that one of the plurality of threads has crashed;
incrementing the value of the counter to a second value based on determining that one of the plurality of threads has crashed;
determining whether the second value is greater than the first value;
determining whether the thread comprises the one of the plurality of threads that has crashed when the value of the incremented counter is greater than the first value, the resource being re-allocated to the thread when the thread comprises the one of the plurality of threads that has crashed.
5. The method of claim 4, further comprising:
determining not to re-allocate the resource to the thread when the second value is not greater than the first value.
6. The method of claim 1, further comprising:
determining that one of the plurality of threads has crashed;
associating the one of the plurality of threads with an indicator,
the indicator indicating that the one of the plurality of threads has crashed; and
determining that the resource is allocated to the thread based on the information identifying the thread being associated with the metadata; and
where re-allocating the resource to the thread includes:
determining that the thread is associated with the indicator based on determining that the resource is allocated to the thread,
determining that the thread comprises the one of the plurality of threads that has crashed based on the thread being associated with the indicator, and
re-allocating the resource to the thread based on the thread comprising the one of the plurality of threads that has crashed and the first value.
7. The method of claim 1, further comprising:
incrementing the value of the counter to a second value based on determining that the one of the plurality of threads has crashed; and
where re-allocating the resource to the thread further includes:
determining that the first value is less than the second value, and
re-allocating the resource to the thread further based on the first value being less than the second value.
8. A device comprising:
a processor to:
receive a resource request for a thread, of a plurality of threads, associated with the device,
store, in a memory associated with the device:
metadata associated with a resource corresponding to the resource request, and
information identifying the thread,
retrieve the metadata and the information identifying the thread from the memory to allocate the resource to the thread,
associate, based on retrieving the metadata and the information identifying the thread, the metadata with:
a first value, and
the information identifying the thread,
the first value corresponding to a value of a counter at a time that the metadata is stored in the memory, and
the value of the counter being incremented each time any of the plurality of threads crashes, and
re-allocate, when the thread crashes, the resource to the thread based on associating metadata with the first value and the information identifying the thread.
9. The device of claim 8, where, when re-allocating the resource to the thread, the processor is to:
re-allocate, when the thread crashes, the resource to the thread based on:
associating the metadata with the first value and the information identifying the thread, and
a value of the counter at a time subsequent to the thread crashing.
10. The device of claim 8, where the resource includes a data unit received by the device from another device via a network, and
where, when storing the metadata associated with the resource and the information identifying the thread, the processor is to:
store metadata associated with a header of the data unit and the information identifying the thread in the memory.

11. The device of claim 8, where the processor is further to:
increment, when the thread crashes, the value of the counter from the first value to a second value, and
where, when re-allocating the resource to the thread, the processor is to:
determine, when the thread crashes, that the thread has been allocated the resource and that the resource is associated with the first value,
determine that the first value is less than the second value, and
re-allocate the resource to the thread based on the first value being less than the second value.

12. The device of claim 8, where the processor is further to:
determine that one of the plurality of threads has crashed,
increment the value of the counter to a second value based on determining that one of the plurality of threads has crashed,
determine whether the second value is greater than the first value,
determine whether the thread comprises the one of the plurality of threads that has crashed when the second value is greater than the first value,
the resource being re-allocated to the thread when the thread comprises the one of the plurality of threads that has crashed.

13. The device of claim 12, where the processor is further to:
determine not to re-allocate the resource to the thread when the second value is not greater than the first value.

14. The device of claim 8, where the processor is further to:
determine that one of the plurality of threads has crashed,
associate the one of the plurality of threads with an indicator,
the indicator indicating that the one of the plurality of threads has crashed, and
determine that the resource is allocated to the thread based on the information identifying the thread being associated with the metadata; and
where, when re-allocating the resource to the thread, the processor is to:
determine that the thread is associated with the indicator based on determining that the resource is allocated to the thread,
determine that the thread comprises the one of the plurality of threads that has crashed based on the thread being associated with the indicator, and
re-allocate the resource to the thread based on the thread comprising the one of the plurality of threads that has crashed and the first value.

15. A non-transitory computer-readable medium storing instructions, the instructions comprising:
one or more instructions which, when executed by a processor of a device, cause the processor to:
allocate a resource to a thread, of a plurality of threads associated with the device,
associate, based on allocating the resource, metadata associated with the resource with a first value and information identifying the thread,
the first value corresponding to a value of a counter at a time that the resource is allocated to the thread, and
the value of the counter being incremented each time any of the plurality of threads crashes, and
re-allocate, when the thread crashes, the resource to the thread based on associating the first value with the metadata.

16. The non-transitory computer-readable medium of claim 15, where the one or more instructions to re-allocate the resource to the thread include:
one or more instructions to re-allocate, when the thread crashes, the resource to the thread based on:
associating the metadata with the first value and the information identifying the thread, and
a value of the counter at a time subsequent to the thread crashing.

17. The non-transitory computer-readable medium of claim 15, where the resource includes a data unit received by the device from another device via a network, and
where the metadata includes metadata associated with a header of the data unit.

18. The non-transitory computer-readable medium of claim 15, where the instructions further comprise:
one or more instructions to increment, when the thread crashes, the counter from the first value to a second value, and
where the one or more instructions to re-allocate the resource to the thread include:
one or more instructions to determine, when the thread crashes, that the thread has been allocated the resource and that the resource is associated with the first value,
one or more instructions to determine that the first value is less than the second value, and
one or more instructions to re-allocate the resource to the thread based on the first value being less than the second value.

19. The non-transitory computer-readable medium of claim 15, where the instructions further comprise:
one or more instructions to determine that one of the plurality of threads has crashed,
one or more instructions to increment the value of the counter to a second value based on determining that one of the plurality of threads has crashed,
one or more instructions to determine whether the second value is greater than the first value,
one or more instructions to determine whether the thread comprises the one of the plurality of threads that has crashed when the second value is greater than the first value,
the resource being re-allocated to the thread when the thread comprises the one of the plurality of threads that has crashed.

20. The non-transitory computer-readable medium of claim 19, where the instructions further comprise:
one or more instructions to determine not to re-allocate the resource to the thread when the second value is not greater than the first value.

* * * * *